United States Patent
Lin

(10) Patent No.: US 7,209,189 B2
(45) Date of Patent: Apr. 24, 2007

(54) LCD-TV CAPABLE OF RECEIVING TWO OR MORE DISPLAY SIGNALS

(75) Inventor: Yet-Zen Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 370 days.

(21) Appl. No.: 10/832,385

(22) Filed: Apr. 27, 2004

(65) Prior Publication Data
US 2004/0239821 A1 Dec. 2, 2004

(30) Foreign Application Priority Data
Jun. 2, 2003 (TW) .............................. 92210125 U

(51) Int. Cl.
*H04N 3/14* (2006.01)
(52) U.S. Cl. ..................................... 348/790
(58) Field of Classification Search ................. 348/790, 348/791, 725, 563–567, 569–570, 705, 706
See application file for complete search history.

(56) References Cited

U.S. PATENT DOCUMENTS

| 5,170,252 | A | * | 12/1992 | Gear et al. .................. 348/659 |
| 5,448,307 | A | * | 9/1995 | Gelissen et al. ............ 348/584 |
| 6,122,018 | A | * | 9/2000 | Sugihara et al. ............ 348/705 |
| 6,137,539 | A | * | 10/2000 | Lownes et al. ............. 348/569 |
| 7,030,933 | B2 | * | 4/2006 | Takagi et al. ............... 348/569 |
| 2005/0007500 | A1 | * | 1/2005 | Lin et al. .................... 348/790 |
| 2005/0235312 | A1 | * | 10/2005 | Karaoguz et al. ............. 725/38 |
| 2006/0146203 | A1 | * | 7/2006 | Lin ............................. 348/794 |

* cited by examiner

*Primary Examiner*—Paulos Natnael
(74) *Attorney, Agent, or Firm*—Bacon & Thomas, PLLC

(57) ABSTRACT

A LCD-TV capable of receiving two or more display signals is discloses. An indicator is provided with the LCD-TV to emit light of a specific color corresponding to a display signal when the display signal is displayed on a LCD panel of the LCD-TV.

13 Claims, 6 Drawing Sheets

LCD-TV CAPABLE OF RECEIVING TWO OR MORE DISPLAY SIGNALS

BACKGROUND OF THE INVENTION

1. Field of the Invention

The present invention relates to a LCD-TV capable of receiving at least two display signals, and more particularly, to a LCD-TV having an indicator capable of emitting light of respectively different colors in accordance with display signals of respectively different formats.

2. Description of Related Art

The rapid development of science and technology always brings about new electronic products in the market. However, the electronic products have display signals of respectively different specifications for conforming to a diversity of the products. To support these diverse display signals of respectively different formats, various interfaces for receiving signals are generally provided with the electronic products so as to be connected to an external image device. For example, a display capable of receiving display signals of three different formats can be used to serve as the following three means:

First, the means is a monitor. The image is displayed by receiving a display signal from a graphic card of a personal computer (PC), and a display interface uses to receive the display signal of the PC.

Next, the means is a multi-media display. The above-mentioned monitor is upgraded to become the multi-media display by adding a video decoder and an audio circuit thereto. An interface for multi-media display signals is used to receive a display signal of a multi-media means such as VCD, DVD, and the multi-media display signals normally including a composite video signal, a S-video signal and a component video signal.

Finally, the means is a television (TV). The above-mentioned multi-media display becomes the television by adding a tuner and a channel program device thereto. An interface for TV program signals is performed to receive a TV display signal.

As described above, the monitor is capable of receiving display signals of three different formats by adding a circuit and an interface having respectively different functions. For the convenient explanation of the present invention, the multi-functional monitor is generally called "display" or the well-known "LCD-TV". However, when the LCD-TV switches in accordance with the display signals of the three different formats, the LCD-TV itself lacks an appropriate indication of the display signal currently used on the screen to the user. Hence, this always troubles the user.

SUMMARY OF THE INVENTION

It is therefore an object of the present invention to provide a LCD-TV capable of receiving two or more display signals by providing an indicator capable of emitting light of respectively different colors in accordance with display signals of respectively different formats.

To attain the aforesaid object, a LCD-TV capable of receiving two or more display signals according to the present invention comprises a plurality of interfaces adapt to receive the display signals and output the same signals respectively; a micro controller receives a configuration message corresponding to one of the display signals and outputs a selected flag as well as a color enable flag corresponding to the configuration message; a video decoder electrically connects to the interfaces and the micro controller, and decodes one of the display signals based on the selected flag then outputs a decoded signal; a scaler receives the decoded signal and outs a scaled image; a LCD panel, receiving the scaled image and displaying the same; and an indicator receives the color enable flag and emits light of a color corresponding to the color enable flag.

To attain the aforesaid object, a LCD-TV capable of receiving two or more display signals according to the present invention comprises a plurality of interfaces adapt to receive the display signals and output the same signals respectively; a micro controller receives a configuration message corresponding to one of the display signals and outputs a selected flag as well as a color enable flag corresponding to the configuration message; a video decoder electrically connects to the interfaces and the micro controller, and decodes one of the display signals based on the selected flag then outputs a decoded signal; a scaler receives the decoded signal and outs a scaled image; a LCD panel, receiving the scaled image and displaying the same; and a plurality of indicators emit different colors corresponding to the display signals respectively in accordance with the color enable flag.

Hence, the object of the present invention is achieved by the LCD-TV capable of receiving various display signals and the indicator capable of emitting light of respectively different colors in accordance with respectively different display signals.

Other objects, advantages, and novel features of the invention will become more apparent from the following detailed description when taken in conjunction with the accompanying drawings.

DETAILED DESCRIPTION OF THE PREFERRED EMBODIMENT

For better understanding the techniques of the present invention, two preferred embodiments of the present invention are described below.

Figure 1:
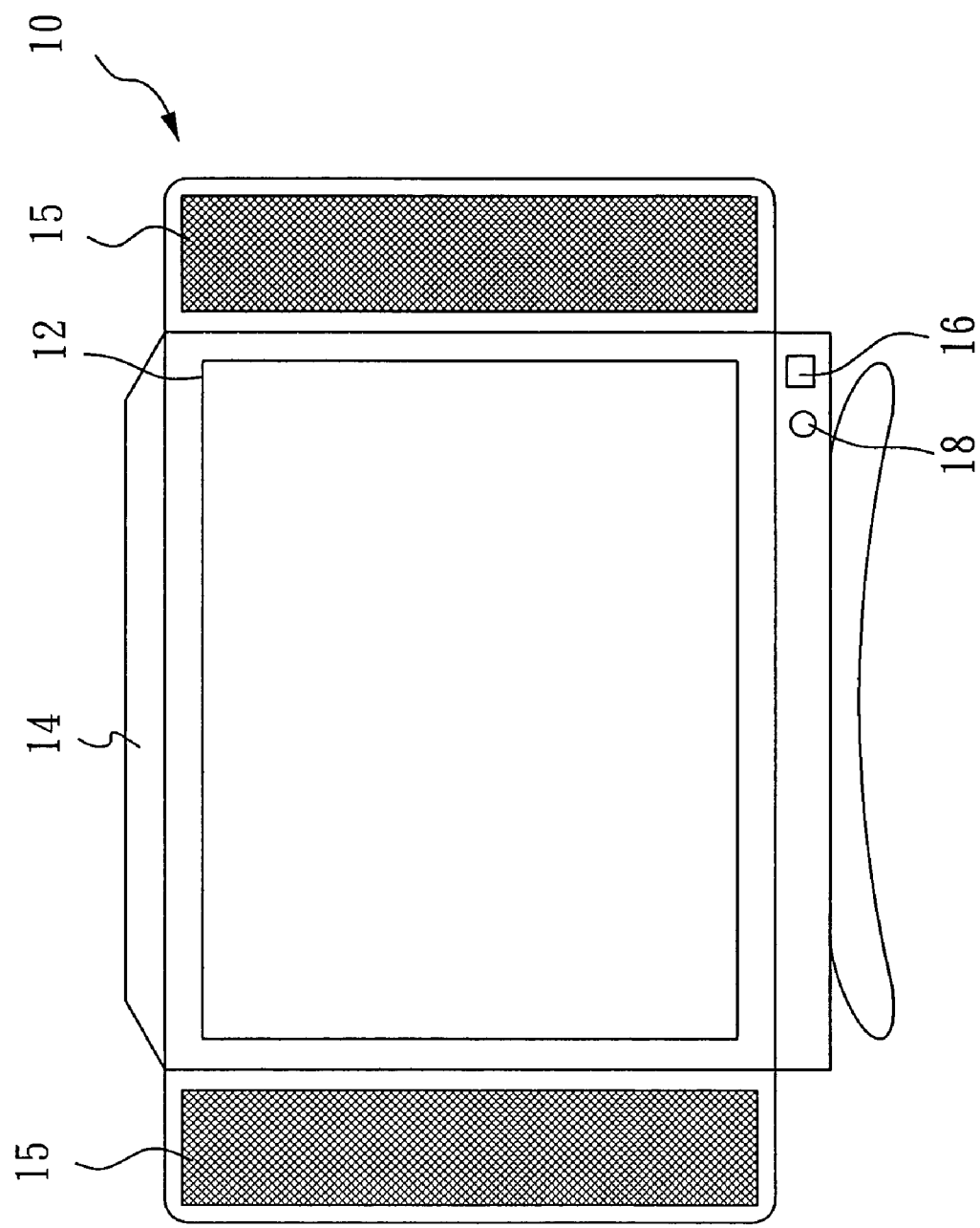
FIG. 1 is a schematic view of a LCD-TV.

FIG. 1 is a schematic view of a LCD-TV 10. The LCD-TV 10 comprises a LCD panel 12, an operating panel 14, speakers 15, an infrared receiver 16 and a multicolor light emitting diode (LED) 18. The LCD panel 12 is adapted to display an image. The speakers 15 are adapted to sound and cause an audio effect. In addition, many other means are included in the LCD-TV 10 without being respectively described herein.

Figure 2:
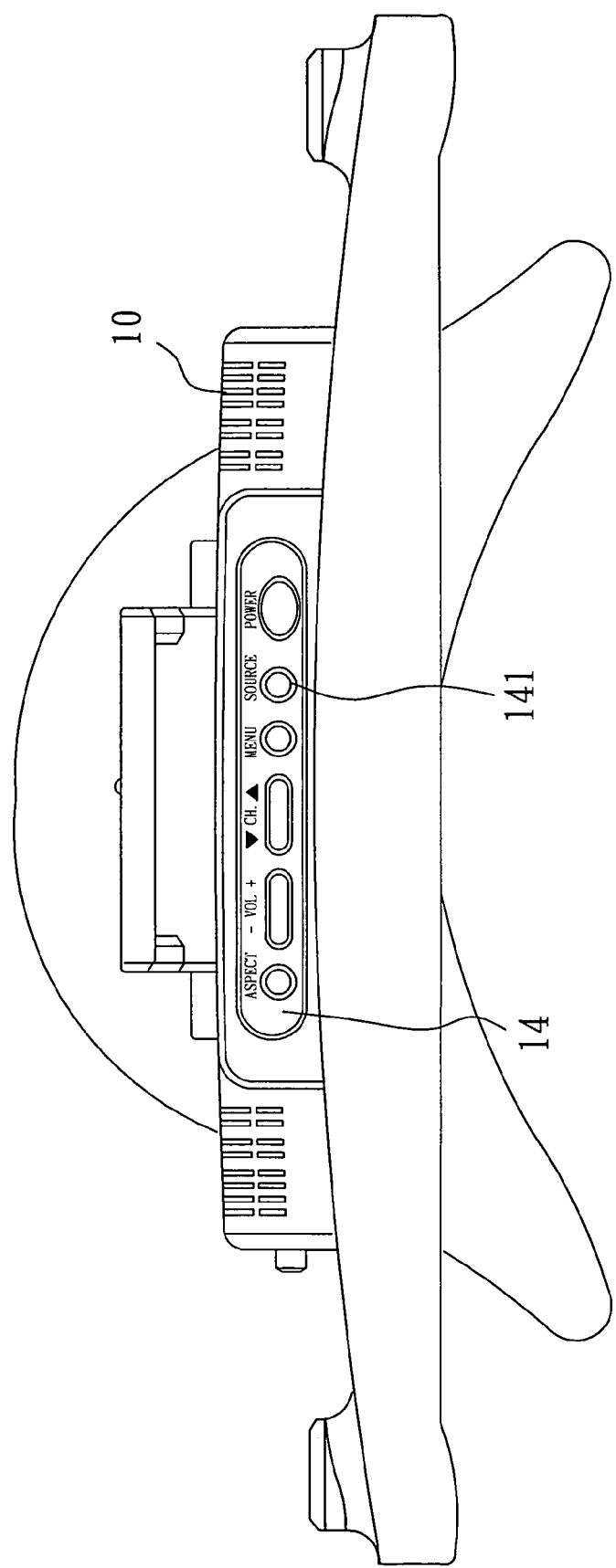
FIG. 2 is a schematic view of an operating panel of a LCD-TV.

FIG. 2 is a schematic view of the operating panel 14 of the LCD-TV 10. The operating panel 14 has a plurality of functional keys. For example, a functional key 141 of signal source is used for cyclically switching respectively different display modes such as multi-media display mode, PC display mode and TV display mode, the multimedia mode including a composite video signal, an S-video signal and a component video signal.

Figure 3:
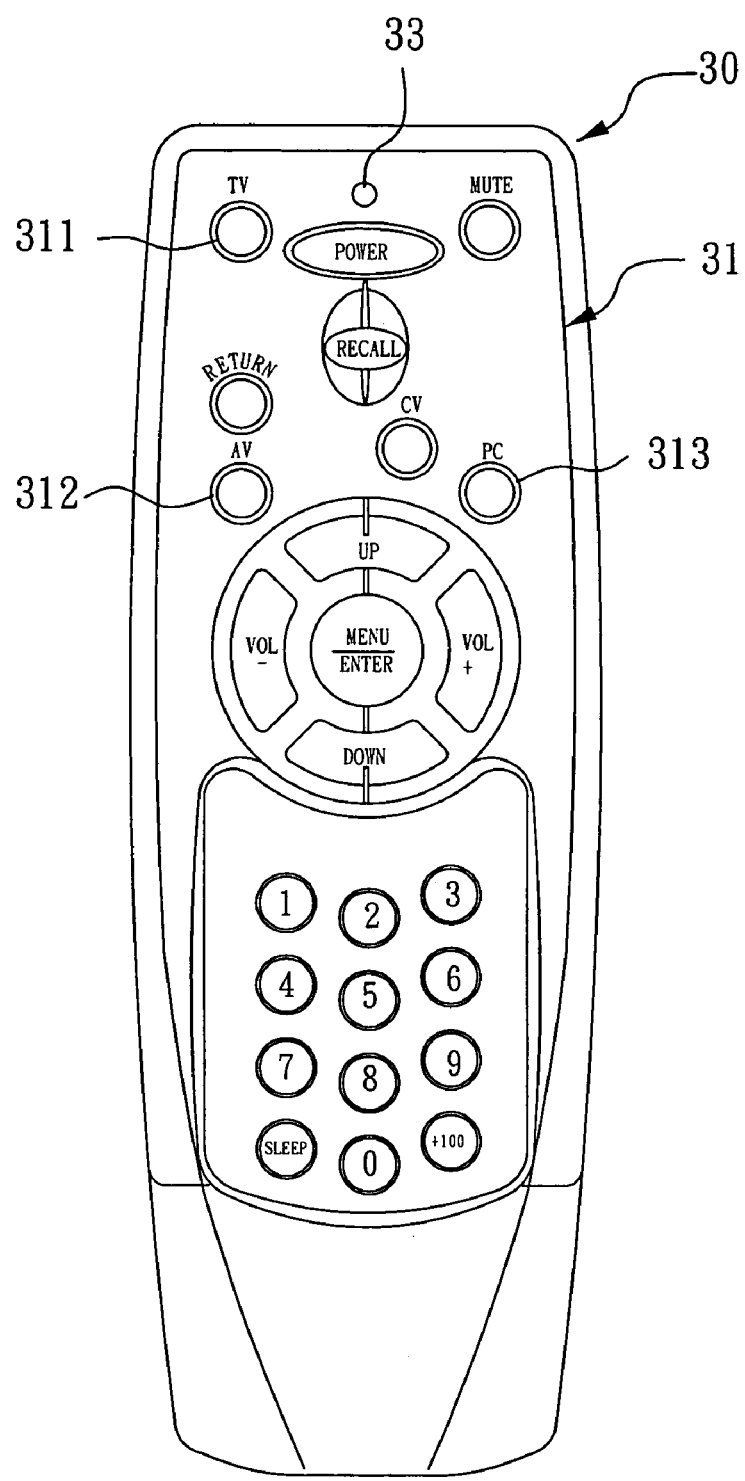
FIG. 3 is a schematic view of a remote control of a LCD-TV.

FIG. 3 is a schematic view of the remote control 30 of the LCD-TV 10. The remote control 30 has a plurality of functional keys. For example, a functional key 311 of TV is performed to switch from the display mode currently used to the TV display mode, a functional key 312 of multi-media is performed to switch from the display mode currently used to the multi-media mode, and a functional key 313 of PC is performed to switch from the display mode currently used to the TV display mode.

The means will be described infra according to the electronic characteristics thereof with reference to the block diagrams, respectively.

Figure 4:
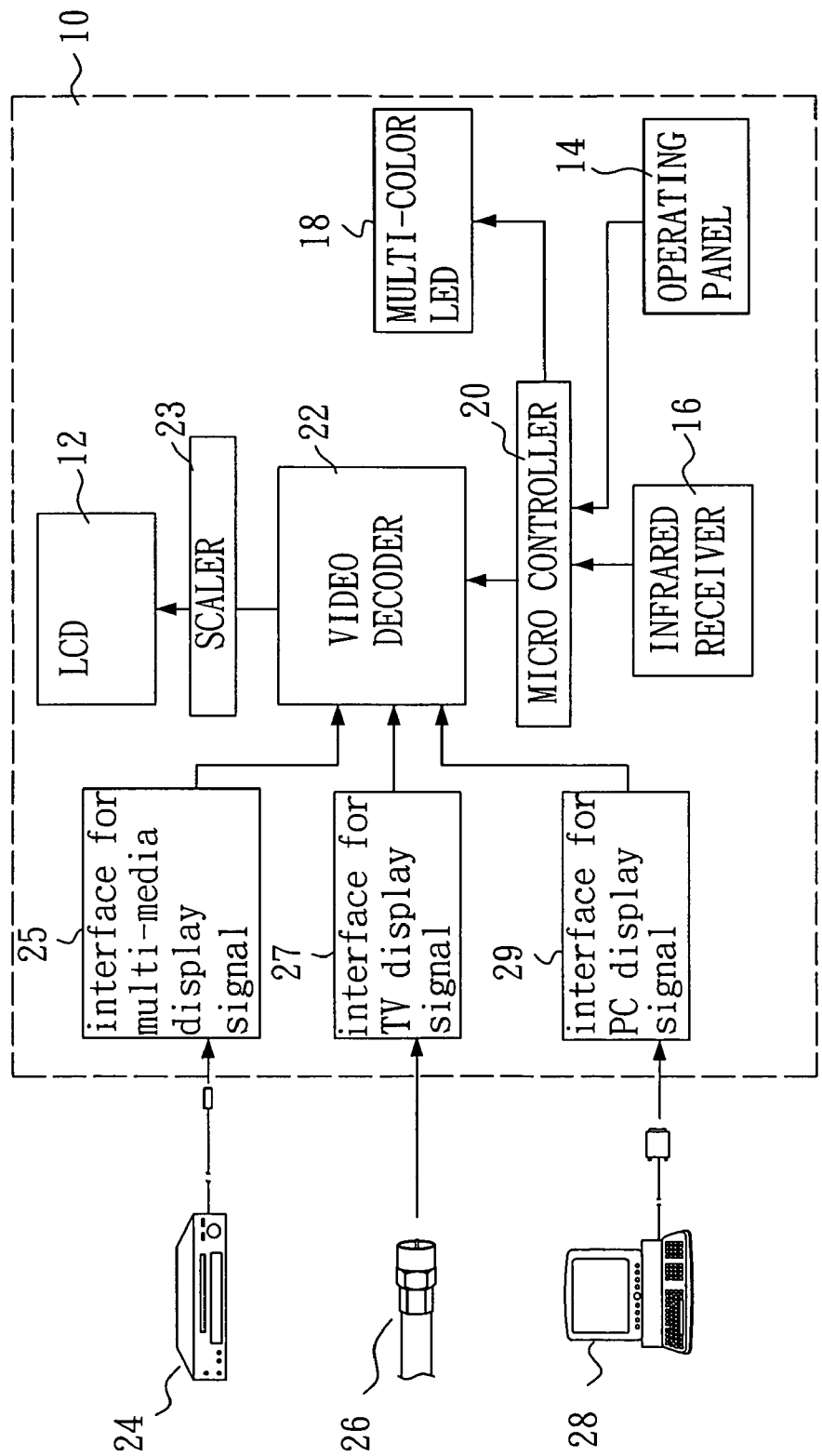
FIG. 4 is a block diagram of a preferred embodiment of a LCD-TV.

FIG. 4 is a block diagram of a preferred embodiment of the LCD-TV 10. The LCD-TV 10 has a plurality of interfaces for display signals, the LCD panel 12, the infrared receiver 16, the multicolor LED 18, a micro controller 20 and a video decoder 22. Hereinafter, the plurality of interfaces for display signals will be, but not limited to, three interfaces 25, 27, 29 for display signals, for example. The interface 25 for multi-media display signals is capable of receiving a multi-media display signal from a multi-media electronic product 24 and outputting the same signal. The interface 27 for TV display signals is capable of receiving a TV display signal from a TV signal source 26 and outputting the same signal. The interface 29 for PC display signals is capable of receiving a PC display signal from a PC 28 and outputting the same signal.

The micro controller 20 is controlled by a wire configuration message outputted from the operating panel 14 and a wireless configuration message outputted from the remote control 30. When the signal-source key of the operating panel 14 or of the remote control 30 is configured (pressed), the micro controller 20 outputs a selected flag as well as a color enable flag corresponding to the selected flag, both the selected flag and the color enable flag corresponding to one of the multi-media display signal, the TV display signal and the PC display signal. The video decoder 22 is connected to output terminals of the interfaces 25, 27, 29 for display signals and micro controller 20 respectively so as to receive a multi-media display signal, a TV display signal, a PC display signal and a selected flag, and then, a video signal is decoded based on the selected flag corresponding to one of the signals. Thus, the signal so decoded is output. For example, when the selected flag corresponds to the TV display signal, the video decoder 22 processes the TV display signal in accordance with the selected flag and outputs a signal so decoded. Then, the LCD panel 12 receives the decoded signal and displays the same. For example, the LCD panel 12 receives a decoded TV display signal that is outputted to display TV programs on the LCD panel 12. Because the formats of the display signals are varied in accordance with the coded characteristics thereof, it is necessary to process a video signal before outputting an appropriate decoded signal. Then, a scaler 23 receives the appropriate decoded signal to outputs a rescaled image to be displayed on the LCD panel 12.

In addition, the multicolor LED 18 receives a color enable flag, and emits light of a color corresponding to the flag. When the selected flag corresponds to the multi-media display signal, the multicolor LED 18 receives the color enable flag corresponding to the selected flag and emits light of blue color. When the selected flag corresponds to the TV display signal, the multicolor LED 18 receives the color enable flag corresponding to the selected flag and emits light of yellow color. When the selected flag corresponds to the PC display signal, the multicolor LED 18 receives the color enable flag corresponding to the selected flag and emits light of green color. Nonetheless, the color of light emitting from the multicolor LED 18 is subject to the application in practice, and shall not be limited to those as mentioned above.

The infrared receiver 16 receives the wireless configuration message radiated from the remote control 30. The message is then sent to the micro controller 20, and is decoded so as to output a selected flag corresponding to the wireless configuration message to the video decoder 22 and a color enable flag corresponding to the wireless configuration message to the multicolor LED 18. The selected flag corresponds to only one of the multi-media display signal, the TV display signal and the PC display signal. Similarly, when the signal-source key 141 of the operating panel 14 is pressed, a wire configuration message is outputted to the micro controller 20 by means of the operating panel 14. The message is decoded so as to output a selected flag corresponding to the wire configuration message to the video decoder 22 and output a color enable flag corresponding to the wire configuration message to the multicolor LED 18. The selected flag thus corresponds to one of the signals. It is inferable from the above description that the micro controller 20 outputs a selected flag as well as a color enable flag corresponding to the selected flag based on a signal from the infrared receiver 16 or the operating panel 14.

Figure 5:
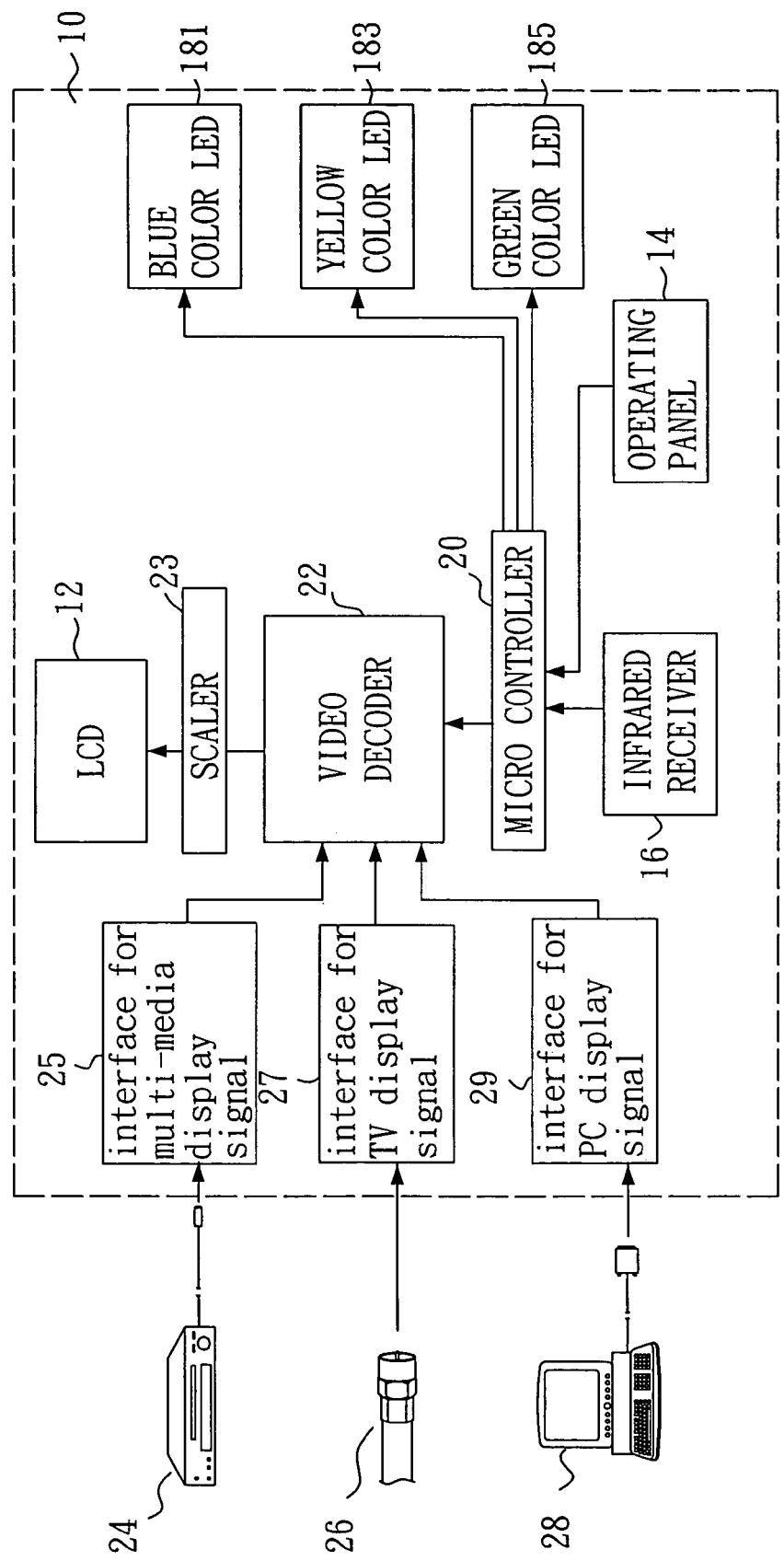
FIG. 5 is a block diagram of another preferred embodiment of a LCD-TV.

FIG. 5 is a block diagram of another preferred embodiment of the LCD-TV 10. In this embodiment, the multicolor LED 18 of the first embodiment is replaced with a plurality of one single color LEDs. The operation of this embodiment is the same as that of the first embodiment. For example, when the selected flag corresponds to the multi-media display signal, a blue color LED 181 receives the color enable flag corresponding to the selected flag and emits light of blue color. When the selected flag corresponds to the TV display signal, a yellow color LED 183 receives the color enable flag corresponding to the selected flag and emits light of yellow color. When the selected flag corresponds to the PC display signal, a green color LED 185 receives the color enable flag corresponding to the selected flag and emits light of green color.

Figure 6:
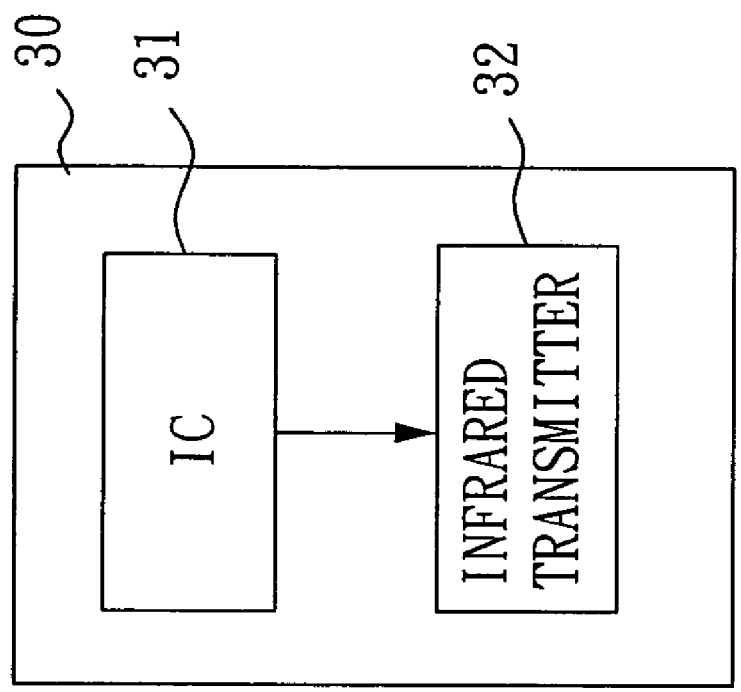
FIG. 6 is a block diagram of a remote control of a LCD-TV.

FIG. 6 is a block diagram of the remote control 30 of the LCD-TV 10. The remote control 30 comprises an integrated circuit (IC) 31 and an infrared transmitter 32. The remote control 30 has a plurality of functional keys, each of which corresponds to a specific function. When one of the functional keys is pressed, the integrated circuit 31 outputs a wireless configuration message to be transmitted to the infrared receiver 16 by means of the infrared transmitter 32. If the functional key 311 of TV is pressed, the integrated circuit 31 outputs a wireless configuration message corresponding to the TV signals, the message being transmitting to the infrared receiver 16. Then, the LCD-TV processes the TV display signals to display TV programs on the LCD panel 12.

Although the present invention has been explained in relation to its preferred embodiments, it is to be understood that many other possible modifications and variations can be made without departing from the scope of the invention as hereinafter claimed.

What is claimed is:

1. A LCD-TV capable of receiving a plurality of display signals, comprising:
    a plurality of interfaces, adapting to receive the display signals and output the same signals respectively;

a micro controller, receiving a configuration message corresponding to one of the display signals and outputting a selected flag as well as a color enable flag corresponding to the configuration message;

a video decoder, electrically connecting to the interfaces and the micro controller, and decoding one of the display signals based on the selected flag then outputting a decoded signal;

a scaler, receiving the decoded signal and out a scaled image;

a LCD panel, receiving the scaled image and displaying the same; and an indicator, receiving the color enable flag and emitting light of a color corresponding to the color enable flag;

wherein the interfaces for receiving display signals receive at least two display signals selected from the group consisting of a multi-media display signal, a TV display signal and a PC display signal, and the indicator is illuminated in at least two colors selected from the group consisting of blue color, green color, yellow color, white color and red color.

2. The LCD-TV of claim 1, further comprises a wireless receiver for receiving the configuration message made in a wireless manner and outputting the same message.

3. The LCD-TV of claim 2, wherein the wireless receiver is an infrared receiver.

4. The LCD-TV of claim 1, further comprises an operating panel for outputting the configuration message made in a wired manner.

5. The LCD-TV of claim 1, wherein the indicator is a multicolor LED.

6. The LCD-TV of claim 1, wherein the indicator is illuminated in at least two colors each respectively corresponding to the at last two display signals received by the interfaces.

7. The LCD-TV of claim 6, wherein the indicator emits light of blue color to correspond to a multi-media display signal, light of yellow or white color to correspond to a TV display signal, and light of green color to correspond to a PC display signal.

8. A LCD-TV capable of receiving two or more display signals, comprising:

a plurality of interfaces, adapting to receive the display signals and output the same signals respectively;

a micro controller, receiving a configuration message corresponding to one of the display signals and outputting a selected flag as well as a color enable flag corresponding to the configuration message;

a video decoder, electrically connecting to the interfaces and the micro controller, and decoding one of the display signals based on the selected flag then outputting a decoded signal;

a scaler, receiving the decoded signal and out a scaled image;

a LCD panel, receiving the scaled image and displaying the same; and a plurality of indicators, emitting different colors corresponding to the display signals respectively in accordance with the color enable flag;

wherein the interfaces for receiving display signals receive at least two display signals selected from the group consisting of a multi-media display signal, a TV display signal and a PC display signal, and the indicators are illuminated in at least two colors selected from the group consisting of blue color, green color, red color, white color and yellow color.

9. The LCD-TV of claim 8, further comprises a wireless receiver for receiving the configuration message made in a wireless manner and outputting the same message.

10. The LCD-TV of claim 9, wherein the wireless receiver is an infrared receiver.

11. The LCD-TV of claim 8, further comprises an operating panel for outputting the configuration message made in a hard wired manner.

12. The LCD-TV of claim 8, wherein the indicators are illuminated in at least two colors each respectively corresponding to the at last two display signals received by the interfaces.

13. The LCD-TV of claim 12, wherein the indicators are selected from the group consisting of a blue LED, a yellow LED and a green LED, wherein the blue LED is used for receiving the color enable flag corresponding to a multi-media display signal and emitting light of blue color, the yellow LED is used for receiving a color enable flag corresponding to a TV display signal and emitting light of yellow color, and the green LED is used for receiving the color enable flag corresponding to a PC display signal and emitting light of green color.

* * * * *